D. E. McSHERRY.
Seed-Drill Teeth.
No. 69,571.
Patented Oct. 8, 1867.
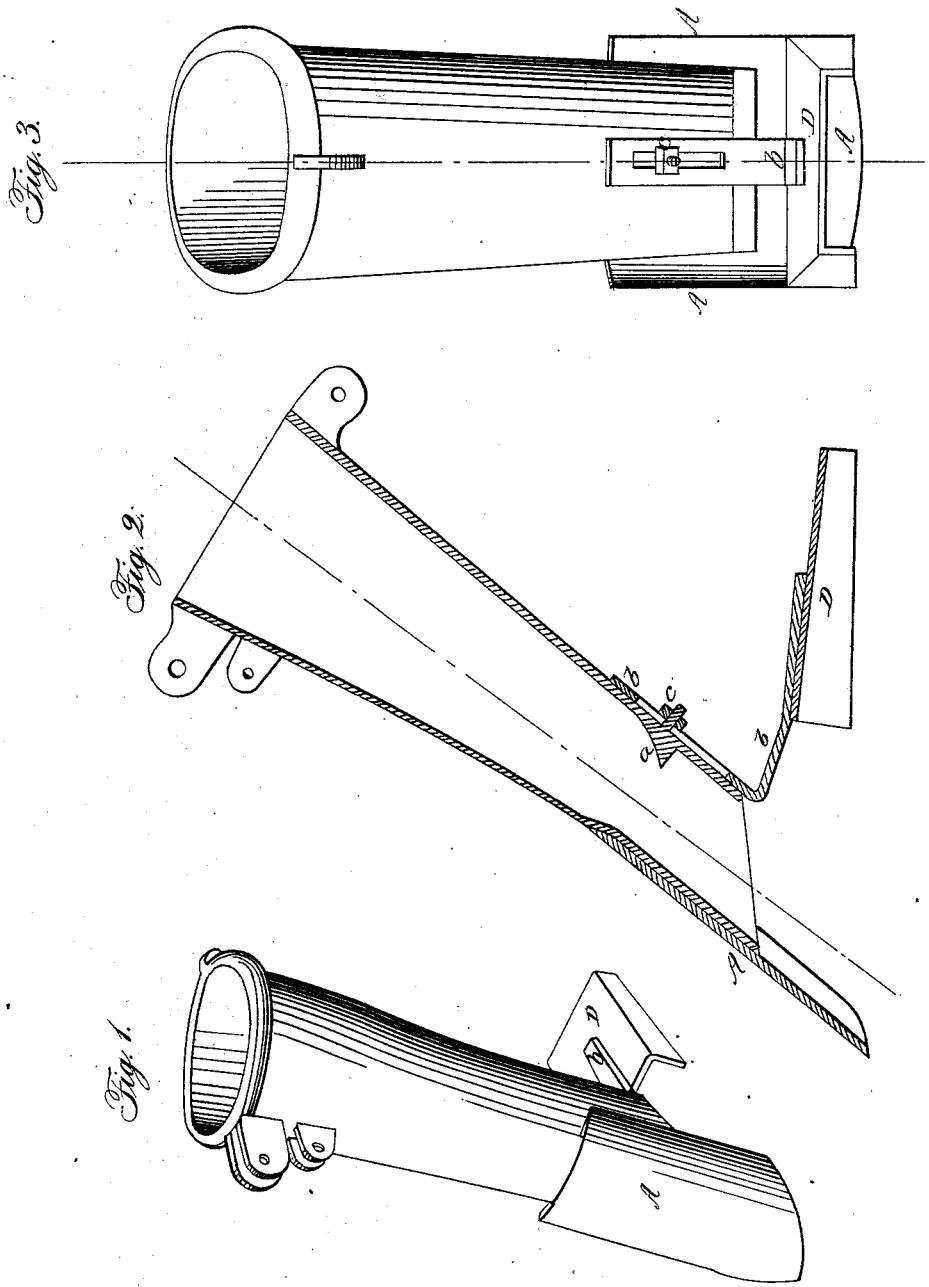
Witnesses:
Inventor:
Daniel E. McSherry
by his agent
Mason Fenwick Lawrence

United States Patent Office.

DANIEL E. McSHERRY, OF DAYTON, OHIO.

Letters Patent No. 69,571, dated October 8, 1867.

IMPROVEMENT IN RICE OR SEED-DRILL TOOTH.

The Schedule referred to in these Letters Patent and making part of the same.

TO ALL WHOM IT MAY CONCERN:

Be it known that I, DANIEL E. McSHERRY, of Dayton, in the county of Montgomery, and State of Ohio, have invented a Rice-Drill Hoe and Tooth; and I do hereby declare that the following is a full, clear, and exact description thereof, reference being had to the accompanying drawings, making part of this specification, in which—

Figure 1 is a perspective view of the improved drill-hoe and tooth.

Figure 2 is a vertical central section taken longitudinally through the same.

Figure 3 is a rear view of fig. 1.

Similar letters of reference indicate corresponding parts in the three figures.

This invention relates to a new and useful improvement in constructing hoes and teeth for rice-drills, the object of which is to scatter the rice evenly over the bottoms of broad furrows, and at the same time to deposit the rice at an even depth and cover it slightly.

To effect the above-mentioned object, the nature of my invention consists in a tooth, of a circular or elliptical shape at and near its top, terminating in a rectangular or flattened discharging end, and also in a hoe or shovel; and in employing, upon the inside of and at the back part of said flattened or rectangular portion, a ridge or projection, so arranged as to spread the rice laterally and cause it to be scattered evenly over the furrow from side to side, as will be hereinafter described. It also consists in providing a rice-drill tooth with an adjustable drag or coverer, which is applied to the rear or back side of the tooth, and constructed with side flanges or wings, so as to regulate the depth desired for the hoe to run in the ground, and also to spread the earth lightly over the rice deposited in the furrow, as will be hereinafter described.

To enable others skilled in the art to understand my invention, I will describe its construction and operation.

In the accompanying drawings I have represented a hollow tooth, terminating at its lower front side in a steel shovel, A, for the purpose of opening a wide, flat-bottom furrow. The upper portion of this tooth is made circular in cross-section, and the lower portion is made rectangular in cross-section, and slightly narrower than the width of the furrow made by the shovel. In using this tooth it is inclined backward, as shown in fig. 2, and the rice, falling from the hopper or discharging devices, passes down the back part of the tooth and strikes upon an inclined ridge or elevation, $a$, which extends transversely across the flat portion of the tooth and forms a spreader for causing the rice to leave the tooth in a thin stream which will be distributed evenly over the whole width of the bottom of the furrow. In order to have the tooth operate to the best advantage the inclined ridge $a$ should be in a horizontal plane, parallel to the base of the furrow, otherwise the grains of rice will be thrown toward one side or the other of the furrow. If the ridge $a$ is not perfectly straight, that is to say, if it curves toward the centre, the grains of rice would be discharged in a ridge in the centre of the furrow—a result which is not desired. To the rear side of the tooth, near its lower end, a slotted piece, $b$, is secured, by a binding-nut, $c$, applied to a screw-stud which passes through the slot in said piece. This piece $b$ is bent backward and secured rigidly to a coverer, D, which consists of a flat plate having its longitudinal sides bent downward, as shown in the drawings. The lower edges of the sides of this coverer rest upon the bottom of the furrow made by the shovel B, and form runners for determining the depth to make the furrow. If a deeper furrow is desired the coverer is adjusted upward; if a shallower furrow is required the coverer is depressed. The side wings or runners of the coverer D are not parallel, but converge to a point, which is some distance in rear of the tooth; consequently these wings will draw in the earth from the sides of the furrow and spread it thinly over the rice covering the bottom of the furrow.

Having described my invention, what I claim as new, and desire to secure by Letters Patent, is—

1. The construction of a rice-drill tooth, of the form substantially as shown and described, and with a transverse ridge, $a$, upon the inside of its back plate.

2. The construction of the adjustable drag or coverer D upon the back of the tooth, substantially as described.

DANIEL E. McSHERRY. [SEAL.]

Witnesses:
GAMUS BYRNE,
SAM'L B. JACKSON.